3,409,609
ADROSTANO-PYRIDINES AND
THEIR PREPARATION
Theodore C. Miller, East Greenbush, N.Y., assignor to Sterling Drug Inc., New York, N.Y., a corporation of Delaware
No Drawing. Filed Dec. 24, 1964, Ser. No. 421,090
24 Claims. (Cl. 260—239.5)

ABSTRACT OF THE DISCLOSURE

Androstano[3,2-b]-6'-R-pyridines and androstano[17,16-b]-6'-R-pyridines are prepared by pyrolysis of 2-(3-R-allylidene)-3-oximinoandrostanes and 16-(3-R-allylidene)-17-oximinoandrostanes, respectively, where R is lower-alkyl, phenyl, furyl or thienyl. The final products where R is furyl can be ozonized to give compounds where R is carboxy, and the latter decarboxylated to afford compounds where R is hydrogen. Also disclosed is the preparation of bis(17β-oxyandrostano[3,2-b:2′,3′-e])pyridines.

---

This invention relates to compositions of matter classified in the art of chemistry as heterocyclic substituted steroids and to processes for making such compositions, including novel intermediates.

The invention sought to be patented, in its composition form is described as residing in the concept of a chemical compound having a molecular structure in which a pyridine ring is attached to a steroid nucleus in the [3,2-b] or [17,16-b] configuration.

A preferred aspect of the invention resides in compounds of the formula

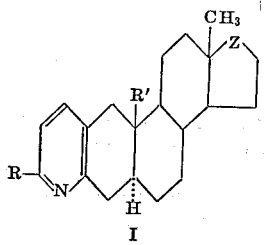

I wherein R is hydrogen, carboxy, lower-alkyl, phenyl, furyl or thienyl; R' is hydrogen or methyl; and Z is C=O, CH(OH-β), C(lower-alkyl)(OH-β), CH(OAcyl-β), or C(lower-alkyl)(OAcyl-β), Acyl being carboxylic acyl having from 1 to 10 carbon atoms; including compounds of the above formula having one double bond in the 4,5-position, or two double bonds, one in the 4,5-position and the other in the 6,7-position.

The term "lower-alkyl" as used herein refers to alkyl groups having from one to six carbon atoms, including such radicals as methyl, ethyl, propyl, isopropyl, butyl, pentyl and hexyl.

The term "Acyl" as used herein refers to acyl radicals derived from carboxylic acids having from one to ten carbon atoms and a molecular weight less than 200. Representative of the acyl radicals which can be present are lower-alkanoyl, e.g., formyl, isobutyryl, caproyl, heptanoyl, octanoyl, trimethylacetyl, and the like; carboxy-lower-alkanoyl, e.g., succinyl (β-carboxypropionyl); cycloalkyl-lower-alkanoyl wherein cycloalkyl has 5–6 ring members, e.g., β-cyclopentylpropionyl, β-cyclohexyl-propionyl, and the like; benzoyl; phenyl-lower-alkanoyl or -alkenoyl, e.g., phenylacetyl, β-phenylpropionyl, cinnamoyl, and the like; phenoxy-lower-alkanoyl, e.g., p-chlorophenoxyacetyl; and pyridylcarbonyl, e.g., nicotinoyl and isonicotinoyl. In acyl radicals containing a phenyl group, the latter can be unsubstituted or substituted by from one to three substituents inert under the reaction conditions used, including lower-alkyl, lower-alkoxy, halogen (including fluorine, chlorine, bromine and iodine) and nitro.

In compounds of Formula I wherein R is phenyl, furyl or thienyl, these groups can be either unsubstituted or substituted by from one to three substituents inert under the reaction conditions used, including lower-alkyl, lower-alkoxy, halogen and nitro. When R is furyl (or thienyl) it can be either 2-furyl (2-thienyl) or 3-furyl (3-thienyl).

The compounds of Formula I wherein R is lower-alkyl, phenyl, furyl or thienyl, R' is hydrogen or methyl, and Z is CH(OH-β), C(lower-alkyl)(OH-β), CH(OAcyl-β), or C(lower-alkyl)(OAcyl-β), including 4-unsaturated and 4,6-di-unsaturated compounds, are prepared according to the following series of reactions:

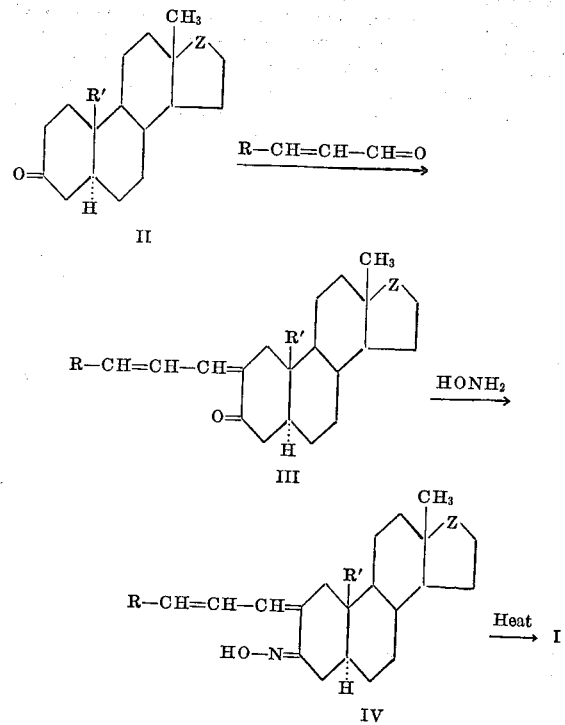

A 3-oxo steroid of Formula II is condensed with 3-R-acrolein in the presence of a strong base, for example, an alkali metal hydroxide, alkoxide or amide to give a 2-(3-R-allylidene)-3-oxo steroid of Formula III. The latter is converted to its oxime (IV) which upon heating is cyclized to a compound of Formula I. The cyclization takes place at a temperature above the melting point of preferably between about 200° and 250° C.:

The intermediates of Formulas III and IV, including compounds wherein the oximino group is acylated, are novel classes of compounds and are within the purview of the invention.

The compounds of Formula I wherein R is hydrogen are prepared by subjecting a compound of Formula I wherein R is 2-furyl to ozonolysis to give the corresponding compound wherein R is carboxy, followed by decarboxylating the latter by heating it above its melting point, preferably between about 200° and 250° C.:

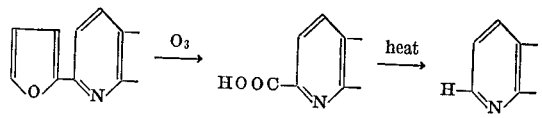

The compounds of Formula I wherein Z is C=O are prepared from the corresponding compounds wherein Z is CH(OH-β) by conventional oxidation reactions, as by use of chromic oxide or by the Oppenauer method.

Another preferred aspect of the invention resides in compounds of the formula

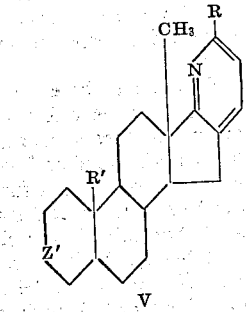

V where R is hydrogen, carboxy, lower-alkyl, phenyl, furyl or thienyl; R' is hydrogen or methyl; and Z' is C=O, CH(OH), or CH(OAcyl), Acyl being carboxylic acyl having from 1 to 10 carbon atoms; including compounds of the above Formula V wherein Z' is C=O and having a double bond in the 4,5-position, and compounds wherein Z' is CH(OH) or CH(OAcyl) and having a double bond in the 5,6-position. The saturated compounds of Formula V can belong to either the 5α- or 5β-series; and in compounds wherein Z' is CH(OH) or CH(OAcyl) the oxy group can have either the α- or β-configuration.

The terms "lower-alkyl" and "Acyl" and the groups represented by R have the same definition and scope as given above in connection with the compounds of Formula I.

The compounds of Formula V wherein R is lower-alkyl, phenyl, furyl or thienyl, R' is hydrogen or methyl, and Z is CH(OH) or CH(OAcyl), including 5,6-unsaturated compounds, are prepared by a series of reactions analogous to that used in preparing the compounds of Formula I, as follows:

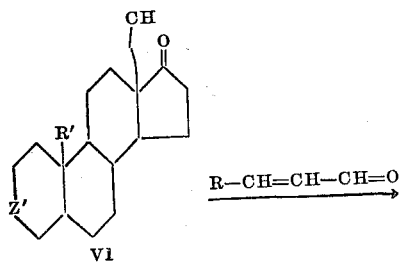

VI

R—CH=CH—CH=O
→

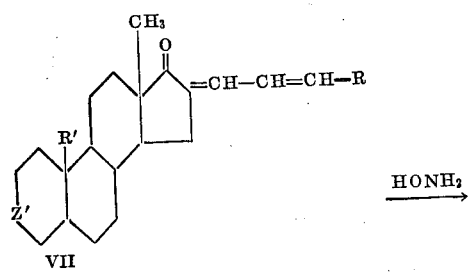

VII

HONH₂
→

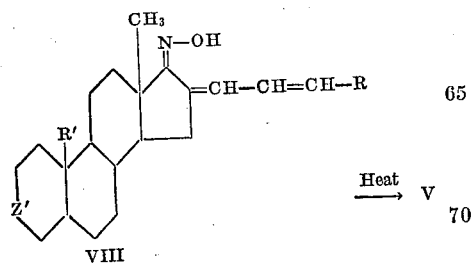

VIII

Heat
→ V

A 17-oxo steroid of Formula VI is condensed with 3-R-acrolein in the presence of a strong base, for example, an alkali metal hydroxide, alkoxide or amide to give a 16-(3-R-allylidene)-17-oxo steroid of Formula VII. The latter is converted to its oxime (VIII) which upon heating is cyclized to a compound of Formula V. The cyclization takes place at a temperature above the melting point of the oxime, preferably between about 200° and 250° C.

The intermediates of Formula VIII, including compounds wherein the oximino group is acylated, are novel classes of compounds and are within the purview of the invention.

The compounds of Formula V wherein R is hydrogen are prepared by subjecting a compound of Formula V wherein R is 2-furyl to ozonolysis to give the corresponding compound wherein R is carboxy, followed by decarboxylating the latter by heating it above its melting point, preferably between about 200° and 250° C.:

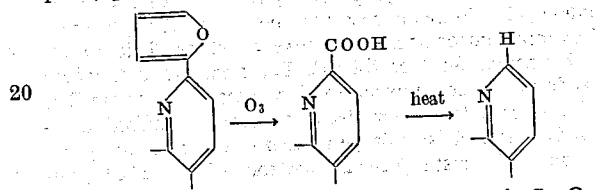

The compounds of Formula V wherein Z is C=O are prepared from the corresponding compounds wherein Z is CH(OH) by conventional oxidation reactions, as by use of chromic oxide or by the Oppenauer method.

Still another aspect of the invention resides in compounds of the formula

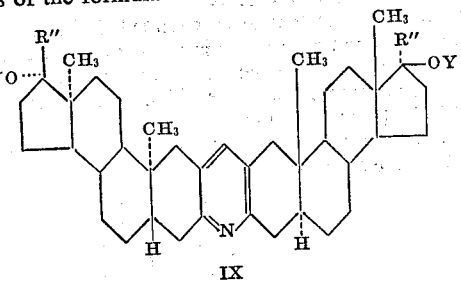

IX wherein R" is hydrogen or lower-alkyl, and Y is hydrogen or Acyl. The terms "lower-alkyl" and "Acyl" have the same definition and scope as given above in connection with the compounds of Formula I.

The compounds of Formula IX are prepared by reacting with hydroxylamine a compound of the formula

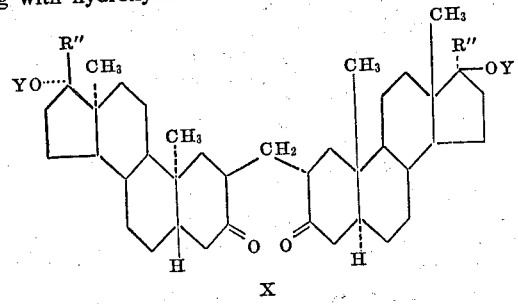

X

The compounds of Formula X are in turn prepared by reacting with formaldehyde a 2-hydroxymethylene-3-oxo steroid of the formula

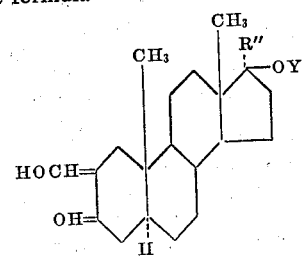

II

The compounds of the invention are basic in nature and thus form acid-addition salts when treated with a moderate to strong inorganic or organic acid. These salts are the full equivalent of the corresponding free bases insofar as the physiological properties inherent in the cation are concerned. Both the free base and salt forms are considered to be one and the same invention.

The structures of the compounds of the invention were established by the modes of synthesis, by elementary analysis and by ultraviolet and infrared spectral data.

Biological evaluation of the compounds of Formulas I, III, IV (including esters thereof), V, VII, VIII (including esters thereof) and IX, has shown that they possess endocrinological properties, for example, anti-estrogenic, anabolic, androgenic, minerocorticoid modifying and desoxycorticosterone acetate potentiating activities; and pharmacological properties, for example, cardiovascular activity.

The following examples will further illustrate the invention without the latter being limited thereby.

EXAMPLE 1

2-cinnamylidene-5α-androstan-17β-ol-3-one [III; R is $C_6H_5$, R' is $CH_3$, Z is CH(OH-β)]

A mixture of 14.52 g. (0.0500 mole) of 5α-androstan-17β-ol-3-one and 3.30 g. (0.0500 mole) of 85% potassium hydroxide was dissolved by heating in 250 ml. of methanol. The solution was cooled to room temperature and 13.20 g. (0.100 mole) of cinnamaldehyde was added. The reaction mixture was stirred for seventy minutes at room temperature and for sixty minutes at ice-bath temperature. The solid product was collected by filtration, washed with cold methanol and dried in vacuo at 60° C. to give 16.41 g. of 2-cinnamylidene-5α-androstan-17β-ol-3-one, yellow needles, M.P. 180.0–181.0° C. (corr.) when recrystallized from ethyl acetate; $[\alpha]_D^{25} = +60.0°$ (1% in chloroform); ultraviolet maxima at 233 and 337 mμ ($\epsilon$=9,000 and 35,500).

By replacing the cinnamaldehyde in the foregoing preparation by a molar equivalent amount of crotonaldehyde, β-(3-furyl)acrolein, β-(2-thienyl)acrolein, β-(3-thienyl)acrolein, 4-methylcinnamaldehyde or 4-fluorocinnamaldehyde, there can be obtained, respectively, 2-(2-butenylidene)-5α-androstan-17β-ol-3-one,
2-[3-(3-furyl)allylidene]-5α-androstan-17β-ol-3-one,
2-[3-(2-thienyl)allylidene]-5α-androstan-17β-ol-3-one,
2-[3-(3-thienyl)allylidene]-5α-androstan-17β-ol-3-one,
2-(4-methylcinnamylidene)-5α-androstan-17β-ol-3-one or
2-(4-fluorocinnamylidene)-5α-androstan-17β-ol-3-one.

By replacing the 5α-androstan-17β-ol-3-one in the foregoing preparation by a molar equivalent amount of 19-nor-5α-androstan-17β-ol-3-one, 4-androsten-17β-ol-3-one, or 4,6-androstadien-17β-ol-3one, there can be obtained, respectively, 2-cinnamylidene-19-nor-5α-androstan-17β-ol-3-one, 2-cinnamylidene-4-androstan-17β-ol-3-one, or 2 cinnamylidene-4,6-androstadien-17β-ol-3-one.

2-cinnamylidene-5α-androstan-17β-ol-3-one (4.05 g.), 0.19 g. of p-toluenesulfonic acid and 11 ml. of ethylene glycol in 150 ml. of benzene was heated at reflux for six hours under a water separator. The reaction mixture was washed with saturated sodium bicarbonate solution and the organic layer separated and washed with water, dried over anhydrous sodium sulfate and concentrated in vacuo. The residue was recrystallized from ether and from ethyl acetate to give the ethylene glycol ketal of 2-cinnamylidene-5α-androstan-17β-ol-3-one, colorless needles, M.P. 203.8–205.0° C. (corr.); $[\alpha]_D^{25} = +47.5°$ (1% in chloroform).

EXAMPLE 2

17β-acetoxy-2-cinnamylidene-5α-androstan-3-one [III; R is $C_6H_5$, R' is $CH_3$, Z is CH(OCOCH$_3$-β)]

A mixture of 1.01 g. (0.0025 mole) of 2-cinnamylidene-5α-androstan-17β-ol-3-one, 5 ml. of acetic anhydride and 10 ml. of pyridine was heated on a steam bath for thirty minutes. The reaction mixture was poured into 100 ml. of ice-water, and the solid product was collected, dried, and recrystallized first from an ethyl acetate-hexane mixture and then from an ethyl acetate-ethanol mixture to give 17β-acetoxy-2-cinnamylidene-5α-androstan-3-one, yellow needles, M.P. 227.0–228.0° C. (corr.), $[\alpha]_D^{25} = +0.3°$ (1% in chloroform); ultraviolet maxima at 233 and 388 mμ ($\epsilon$=6,800 and 34,900).

By replacing the acetic anhydride in the foregoing preparation by a molar equivalent amount of caproyl chloride, succinic anhydride, β-cyclohexylpropionyl chloride, benzoyl chloride, p-nitrobenzoyl chloride, phenylacetyl chloride, p-chlorophenoxyacetyl chloride, cinnamoyl chloride or nicotinoyl chloride, there can be obtained, respectively, 17β-caproyloxy-2-cinnamylidene-5α-androstan-3-one,
17β-(β-carboxypropionoxy)-2-cinnamylidene-5α-androstan-3-one,
17β-(β-cyclohexylpropionoxy)-2-cinnamylidene-5α-androstan-3-one,
17β-benzoyloxy-2-cinnamylidene-5α-androstan-3-one,
17β-(p-nitrobenzoyloxy)-2-cinnamylidene-5α-androstan-3-one,
17β-phenylacetoxy-2-cinnamylidene-5α-androstan-3-one,
17β-(p-chlorophenoxyacetoxy)-2-cinnamylidene-5α-androstan-3-one or
17β-cinnamoyloxy-2-cinnamylidene-5α-androstan-3-one or
17β-nicotinoyloxy-2-cinnamylidene-5α-androstan-3-one.

EXAMPLE 3

2-[3-(2-furyl)allylidene]-5α-androstan-17β-ol-3-one [III; R is 2-furyl, R' is $CH_3$, Z is CH(OH-β)] was prepared from 2.90 g. of 5α-androstan-17β-ol-3-one and 1.34 g. of β-(2-furyl)acrolein according to the procedure described above in Example 1. The product was recrystallized from a mixture of methylene dichloride and methanol to give 2-[3-(2-furyl)allylidene]-5α-androstan-17β-ol-3-one, M.P. 192–194° C. (uncorr.).

EXAMPLE 4

2-cinnamylidene-17α-methyl-5α-androstan-17β-ol-3-one [III; R is $C_6H_5$, R' is $CH_3$, Z is C(CH$_3$)(OH-β)] was prepared from 18.27 g. of 17α-methyl-5α-androstan-17β-ol-3-one and 8.7 g. of cinnamaldehyde according to the procedure described above in Example 1. An amorphous product was obtained which was converted directly to the oxime in Example 8 below.

EXAMPLE 5

2-[3-(2-furyl)allylidene]-17α-methyl-5α-androstan-17β-ol-3-one [III; R is 2-furyl, R' is $CH_3$, Z is $C(CH_3)(OH-\beta)$]

was prepared from 24.36 g. of 17α-methyl-5α-androstan-17β-ol-3-one and 10.27 g. of β-(2-furyl)acrolein according to the procedure described above in Example 1. The product was recrystallized from a mixture of chloroform and ethanol to give 2-[3-(2-furyl)allylidene]-17α-methyl-5α-androstan-17β-ol-3-one in the form of a hemi-ethanolate, yellow needles, M.P. 250.8–253.7° C. (dec.) (corr.); $[\alpha]_D^{25} = +23.6°$ (1% in chloroform); ultraviolet maximum at 360 mμ ($\epsilon$=35,800).

2-[3-(2-furyl)allylidene]-17α-methyl-5α-androstan-17β-ol-3-one can be caused to react with acetic anhydride-pyridine, by heating at 100° C., to give 17β-acetoxy-2-[3-(2-furyl)allylidene]-17α-methyl-5α-androstan-3-one.

EXAMPLE 6

2-cinnamylidene-5α-androstan-17β-ol-3-one oxime [IV; R is $C_6H_5$, R' is $CH_3$, Z is CH(OH-β)]

A mixture of 8.09 g. (0.20 mole) of 2-cinnamylidene-5α-androstan-17β-ol-3-one, 2.78 g. (0.040 mole) of hydroxylamine hydrochloride, 100 ml. of ethanol and 25 ml. of pyridine was heated at reflux for four hours. The reaction mixture was poured into 1 liter of ice-water and after one hour the solid product was collected by filtration and dried in a vacuum oven at 70° C. The product was crystallized from methanol and recrystallized from a mixture of methylene dichloride and methanol to give 2-cinnamylidene-5α-androstan-17β-ol-3-one oxime containing methanol of crystallization, peach-colored needles, M.P. 210–212° C. (uncorr.); ultraviolet maxima at 231 and 322 mμ (ε=10,100 and 36,300); infrared absorption at 2.78, 3.07, 3.45, 6.17, 6.27, 6.72 and 6.90μ.

By replacing the 2-cinnamylidene-5-α-androstan-17β-ol-3-one in the foregoing preparation by a molar equivalent amount of 2-(2-butenylidene)-5α-androstan-17β-ol-3-one,
2-[3-(3-furyl)allylidene]-5α-androstan-17β-ol-3-one,
2-[3-(2-thienyl)allylidene]-5α-androstan-17β-ol-3-one,
2-[3-(3-thienyl)allylidene]-5α-androstan-17β-ol-3-one,
2-(4-methylcinnamylidene)-5α-androstan-17β-ol-3-one,
2-(4-fluorocinnamylidene)-5α-androstan-17β-ol-3-one,
2-cinnamylidene-19-nor-5α-androstan-17β-ol-3-one,
2-cinnamylidene-4-androstan-17β-ol-3-one, or
2-cinnamylidene-4,6-androstadien-17β-ol-3-one, there can be obtained, respectively, 2-(2-butenylidene)-5α-androstan-17β-ol-3-one oxime,
2-[3-(3-furyl)allylidene]-5α-androstan-17β-ol-3-one oxime,
2-[3-(2-thienyl)allylidene]-5α-androstan-17β-ol-3-one oxime,
2-[3-(3-thienyl)allylidene]-5α-androstan-17β-ol-3-one oxime,
2-(4-methylcinnamylidene)-5α-androstan-17β-ol-3-one oxime,
2-(4-fluorocinnamylidene)-5α-androstan-17β-ol-3-one oxime,
2-cinnamylidene-19-nor-5α-androstan-17β-ol-3-one oxime,
2-cinnamylidene-4-androstan-17β-ol-3-one oxime, or
2-cinnamylidene-4,6 androstadien-17β-ol-3-one oxime.

A mixture of 1.00 g. of 2-cinnamylidene-5α-androstan-17β-ol-3-one oxime, 5 ml. of acetic anhydride and 10 ml. of pyridine was heated on a steam bath for two and one-half hours. The reaction mixture was poured into 200 ml. of ice-water with stirring, and the product was collected by filtration, washed with water and dried. After recrystallization from methanol there was obtained 2-cinnamylidene-5α-androstan-17β-ol-3-one oxime diacetate in the form of yellow prisms, M.P. 188.4–196.0° C. (corr.); [α]$_D^{25}$=−42.9° (1% in chloroform); ultraviolet maxima at 231 and 325 mμ (ε=11,500 and 34,200); infared absorption at 3.47, 5.69, 5.80, 6.17, 6.28, 6.40, 6.72, 6.82 and 6.92μ.

EXAMPLE 7

2 - [3 - (2-furyl)allylidene]-5α-androstan-17β-ol-3-one oxime [IV; R is 2-furyl, R′ is CH₃, Z is CH(OH-β)] was prepared from 1.29 g. of 2-[3-(2-furyl)allylidene]-5α-androstan-17β-ol-3-one and 0.45 g. of hydroxylamine hydrochloride according to the procedure described above in Example 6. The product was recrystallized from a mixture of methylene dichloride and methanol to give 2-[3-(2-furyl)allylidene]-5α-androstan-17β-ol-3-one oxime in the form of yellow needles, M.P. about 145° C. (uncorr.).

2 - [3 - (2-furyl)allylidene]-5α-androstan-17β-ol-3-one oxime was heated with acetic anhydride and pyridine to give its diacetate, peach-colored prisms, M.P. 206.2–208.0° C. (dec.)(corr.) when recrystallized from a mixture of methylene dichloride and ethyl acetate; [α]$_D^{25}$=−46.0° (1% in chloroform).

EXAMPLE 8

2 - cinnamylidene - 17α-methyl-5α-androstan-17β-ol-3-one oxime [IV; R is C₆H₅, R′ is CH₃, Z is C(CH₃)(OH-β)] was prepared from 2.00 g. of 2-cinnamylidene-17α-methyl-5α-androstan-17β-ol-3-one and 0.63 g. of hydroxylamine hydrochloride according to the procedure described above in Example 6.

EXAMPLE 9

2 - [3 - (2-furyl)allylidene]-17α-methyl-5α-androstan-17β-ol-3-one oxime [IV; R is 2-furyl, R′ is CH₃, Z is C(CH₃)(OH-β)] was prepared from 26.68 g. of 2-[3-(2-furyl)allylidene] - 17α-methyl-5α-androstan-17β-ol-3-one and 8.61 g. of hydroxylamine hydrochloride according to the procedure described above in Example 6. The product was recrystallized from a mixture of methylene dichloride and methanol to give 2-[3-(2-furyl)allylidene]-17α-methyl-5α-androstan-17β-ol-3-one oxime, M.P. about 150° C. (uncorr.).

2 - [3 - (2-furyl)allylidene]-17α-methyl-5α-androstan-17β-ol-3-one oxime can be converted to its diacetate by heating with an excess of acetic anhydride in pyridine.

EXAMPLE 10

17β-hydroxy-5α-androstano[3,2-b]-6′-phenylpyridine
[I; R is C₆H₅, R′ is CH₃, Z is CH(OH-β)]

2-cinnamylidene-5α-androstan-17β-ol-3-one oxime was heated in a Wood's metal bath at 20–245° C. for ninety minutes under water-aspirator vacuum. The product was cooled and recrystallized first from a mixture of chloroform and ethyl acetate and then from a mixture of methylene dichloride and ethyl acetate to give 17β-hydroxy-5α-androstano[3,2-b]-6′-phenylpyridine, yellow plates, M.P. 239.2–242.0° C. (corr.); [α]$_D^{25}$=+63.6° (1% in chloroform); ultraviolet maxima at 248 and 287 mμ (ε=14,100 and 13,300); infrared absorption at 3.03, 3.47, 5.75, 6.31, 6.40 and 6.80μ.

By replacing the 2-cinnamylidene-5α-androstan-17β-ol-3-one oxime in the foregoing preparation by a molar equivalent amount of 2-(2-butenylidene)-5α-androstan-17β-ol-3-one oxime,
2-[3-(3-furyl)allylidene]-5α-androstan-17β-ol-3-one oxime,
2-[3-(2-thienyl)allylidene]-5α-androstan-17β-ol-3-one oxime,
2-[3-(3-thienyl)allylidene]-5α-androstan-17β-ol-3-one oxime,
2-(4-methylcinnamylidene)-5α-androstan-17β-ol-3-one oxime,
2-(4-fluorocinnamylidene)-5α-androstan-17β-ol-3-one oxime,
2-cinnamylidene-19-nor-5α-androstan-17β-ol-3-one oxime,
2-cinnamylidene-4-androsten-17β-ol-3-one oxime, or
2-cinnamylidene-4,6-androstadien-17β-ol-3-one oxime, there can be obtained, respectively, 17β-hydroxy-5α-androstano[3,2-b]-6′-methylpyridine,
17β-hydroxy-5α-androstano[3,2-b]-6′-(3-furyl)pyridine,
17β-hydroxy-5α-androstano[3,2-b]-6′-(2-thienyl)-pyridine,
17α-hydroxy-5α-androstano[3,2-b]-6′-(3-thienyl)-pyridine,
17β-hydroxy-5α-androstano[3,2-b]-6′-(p-tolyl)pyridine,
17β-hydroxy-5α-androstano[3,2-b]-6′-(4-fluorophenyl)-pyridine,
17β-hydroxy-19-nor-5α-androstano[3,2-b]-6′-phenylpyridine,
17β-hydroxy-4-androsteno[3,2-b]-6′-phenylpyridine, or
17β-hydroxy-4,6-androstadieno[3,2-b]-6′-phenylpyridine.

EXAMPLE 11

17-oxo-5α-androstano[3,2-b]-6′-phenylpyridine
[I; R is C₆H₅, R′ is CH₃, Z is CO]

A solution of 0.75 g. of chromic oxide in 5 ml. of acetic acid and 5 ml. of water was added to a solution of 3.00 g. of 17β-hydroxy - 5α - androstano[3,2-b]-6′-phenylpyridine (Example 10) in 50 ml. of acetic acid. The reaction mixture was stirred for three hours at room temperature and then poured into ice-water. The product was collected by filtration, washed, dried and dissolved in 80 ml. of hot chloroform. The chloroform solution was filtered, concentrated to 40 ml., and 10 ml. of ethanol was added. The crystalline product was separated and recrystallized from chloroform to give 17-oxo-5α-androstano[3,2 - b] - 6′ - phenylpyridine, colorless rods, M.P. 307–316° C. (dec.) (uncorr.), $[α]_D^{25}=+111.9°$ (1% in chloroform); ultraviolet maxima at 252 and 284 mμ ($ε=15,500$ and 13,400).

EXAMPLE 12

17β-hydroxy-5α-androstano[3,2-b]-6′-(2-furyl)pyridine [I; R is 2-furyl, R′ is $CH_3$, Z is CH(OH-β)]

2-[3-(2-furyl)allylidene]androstan-17β-ol-3-one oxime (Example 7) was heated at 220–230° C. (0.1 mm.), the product collected by sublimation and recrystallized from a methylene dichloride-methanol mixture to give 17β-hydroxy-5α-androstano[3,2-b]-6′-(2-furyl)pyridine, pale yellow crystals, M.P. 212.4–214.4° C. (corr.), $$[α]_D^{25}=+72.6°$$

ultraviolet maxima at 266 and 309 mμ ($ε=15,800$ and 18,600); infrared absorption at 2.95, 3.45–3.50, 5.77, 6.25, 6.31, 6.43, 6.68 and 6.87μ.

EXAMPLE 13

17β-acetoxy-5α-androstano[3,2-b] - 6′ - (2-furyl)pyridine [I, R is 2-furyl, R′ is $CH_3$, Z is CH($OCOCH_3$-β)] was prepared by treating 2.41 g. of 17β-hydroxy-5α-androstano[3,2-b] - 6′ - (2-furyl)pyridine with 10 ml. of acetic anhydride and 20 ml. of pyridine for twenty-four hours at room temperature. The product was collected and recrystallized from a mixture of methylene dichloride and acetonitrile to give 17β-acetoxy-5α-androstano[3,2-b] - 6′ - (2 - furyl)pyridine, colorless prisms, M.P. 244.4–245.8° C. (corr.), $[α]_D^{25}=+54.0°$; ultraviolet maxima at 266, 274 and 309 mμ ($ε=15,200$, 13,600 and 18,000).

By replacing the acetic anhydride in the foregoing preparation by a molar equivalent amount of caproyl chloride, succinic anhydride, β-cyclohexylpropionyl chloride, benzoyl chloride, p-nitrobenzoyl chloride, phenylacetyl chloride, p-chlorophenoxyacetyl chloride, cinnamoyl chloride or nicotinoyl chloride there can be obtained, respectively, 17β-caproyloxy-5α-androstano[3,2-b]-6′-(2-furyl)pyridine, 17β-(β-carboxypropionoxy)-5α-androstano[3,2-b]-6′-(2-furyl)pyridine, 17β-(β-cyclohexylpropionoxy)-5α-androstano[3,2-b]-6′-(2-furyl)pyridine, 17β-benzoyloxy-5α-androstano[3,2-b]-6′-(2-furyl)pyridine, 17β-(p-nitrobenzoyloxy)-5α-androstano[3,2-b]-6′-(2-furyl)pyridine, 17β-phenylacetoxy-5α-androstano[3,2-b]-6′-(2-furyl)pyridine, 17β-(p-chlorophenoxyacetoxy)-5α-androstano[3,2-b]-6′-(2-furyl)pyridine, 17β-cinnamoyloxy-5α-androstano[3,2-b]-6′-(2-furyl)pyridine or 17β-nicotinoyloxy-5α-androstano[3,2-b]-6′-(2-furyl)pyrdine.

EXAMPLE 14

17β-hydroxy-17α-methyl-5α-androstano[3,2-b]-6′-phenylpyridine [I; R is $C_6H_5$, R′ is $CH_3$, Z is C($CH_3$)(OH-β)]

2-cinnamylidene-17α-methyl-5α-androstan - 17β - ol-3-one oxime (Example 8) (12.08 g.) was heated at 210–220° C. for one and one-half hours under water aspirator vacuum and then for three hours under high vacuum (0.05 mm.). The product was sublimed and recrystallized from a mixture of methylene dichloride and ethyl acetate to give 17β - hydroxy-17α-methyl-5α-androstano [3,2 - b] - 6′ - phenylpyridine, tan needles, M.P. 209.6–211.8° C. (corr.), $[α]_D^{25}=+42.9°$ (1% in chloroform); ultraviolet maxima at 248 and 287 mμ ($ε=14,400$ and 13,500).

17β-hydroxy-17α-methyl - 5α - androstano[3,2 - b]-6′-phenylpyridine can be caused to react with an excess of acetic anhydride in pyridine by heating at 100° C. to give 17β-acetoxy - 17α - methyl-5α-androstano[3,2-b]-6′-phenylpyridine.

EXAMPLE 15

17β-hydroxy-17α-methyl - 5α - androstano[3,2-b]-6′-(2-furyl)pyridine [I; R is 2-furyl, R′ is $CH_3$, Z is C($CH_3$)(OH-β)]

2-[3-(2-furyl)allylidene]-17α-methyl - 5α - androstan-17β-ol-3-one oxime (Example 9) (8.00 g.) was heated at 210–220° C. under nitrogen until the solid melted, then for two hours under water aspirator vacuum and finally for two hours at 210–220° C. under high vacuum (0.03 mm.). The product was sublimed and recrystallized repeatedly from a mixture of methylene dichloride and ethyl acetate to give 17β-hydroxy-17α-methyl-5α - androstano[3,2 - b] - 6′ - (2 - furyl)pyridine, brown prisms, M.P. 222.2–223.8° C. (corr.), $[α]_D^{25}=+49.0°$ (1% in chloroform); ultraviolet maxima at 266 and 309 mμ ($ε=15,000$ and 17,600); infrared absorption at 2.88, 3.20, 3.45, 5.80, 6.25, 6.32, 6.44, 6.69 and 6.86μ.

EXAMPLE 16

17β-acetoxy-5α-androstano[3,2-b]pyridine [I; R is H, R′ is $CH_3$, Z is CH($OCOCH_3$-β)]

A stream of ozone was passed through a stirred solution of 3.94 g. of 17β-acetoxy-5α-androstano[3,2-b]-6′-(2-furyl)pyridine (Example 13) in 60 ml. of acetic acid and 30 ml. of ethyl acetate for sixty-four minutes (corresponding to 36.4 millimoles of ozone) at −5 to 0° C. There was then added 20 ml. of water dropwise followed by 2 ml. of 30% hydrogen peroxide, and the mixture was stirred for seventeen hours and poured with stirring into 2 liters of deionized water. The resulting 17β-acetoxy-5α-androstano[3,2-b]-6′-carboxypyridine was collected by filtration, washed, dried, heated at 200–210° C. (0.5–0.1 mm.) for four and one-half hours and sublimed to give 17β-acetoxy-5α-androstano[3,2-b]-pyridine, M.P. 137.2–142.2° C. (corr.), $[α]_D^{25}=+44.2°$ (1% in chloroform); ultraviolet maxima at 269 and 277 mμ ($ε=5,660$ and 4,550).

Hydrogen chloride gas was pased through a solution of 17β - acetoxy-5α-androstano[3,2 - b]pyridine in ethyl acetate. The prepared product was separated and recrystallized from a mixture of methylene dichloride and ethyl acetate to give 17β-acetoxy-5α-androstano[3,2-b] pyridine in the form of its hydrochloride salt, M.P. 274.0–276.0° C. (dec.) (corr.), $[α]_D^{25}=+36.2°$ (1% in chloroform).

EXAMPLE 17

17β - hydroxy - 17α - methyl - 5α - androstano[3,2-b]pyridine [I; R is H, R′ is $CH_3$, Z is C($CH_3$)(OH - β)] was prepared by ozonolysis and decarboxylation of 6.77 g. of 17β - hydroxy - 17α - methyl - 5α - androstano[3,2-b] - 6′ - (2 - furyl)pyridine (Example 15) by the procedure described above in Example 16. The product was sublimed and chromatographed on a column of 170 g. of silica gel. The column was eluted with ether-pentane 1:1 and ether-pentane 3:1 and the resulting product was recrystallized from a mixture of methylene dichloride and methanol to give 17β - hydroxy - 17α - methyl - 5α - androstano[3,2 - b]pyridine, beige rods, M.P. 194.8–196.4° C. (corr.), $[α]_D^{25}=+41.7°$ (1% in chloroform); ultraviolet maxima at 269 and 277 mμ ($ε=5,410$ and 4,260).

EXAMPLE 18

16 - cinnamylidene - 5 - androsten - 3β - ol - 17 - one

[VII; R is C₆H₅, R′ is CH₃, Z′ is CH(OH - β), Δ - 5] was prepared from 28.85 g. of 5 - androsten - 3β - ol - 17 - one and 11.84 g. of cinnamaldehyde according to the procedure described above in Example 1. There was thus obtained 40 g. of 16 - cinnamylidene - 5 - androsten - 3β-ol-17-one, M.P. 210.5–213.0° C. (uncorr.).

By replacing the cinnamaldehyde in the foregoing preparation by a molar equivalent amount of crotonaldehyde, β - (3 - furyl)acrolein, β - (2 - thienyl)acrolein, β - (3-thienyl)acrolein, 4 - methylcinnamaldehyde or 4 - fluorocinnamaldehyde there can be obtained, respectively, 16-(2-butenylidene)-5-androsten-3β-ol-17-one,
16-[3-(3-furyl)allylidene]-5-androsten-3β-ol-17-one,
16-[3-(2-thienyl)allylidene]-5-androsten-3β-ol-17-one,
16-[3-(3-thienyl)allylidene]-5-androsten-3β-ol-17-one,
16-(4-methylcinnamylidene)-5-androsten-3β-ol-17-one,
or 16-(4-fluorocinnamylidene)-5-androsten-3β-ol-17-one.

By replacing the 5 - androsten - 3β - ol - 17 - one in the foregoing preparation by a molar equivalent amount of 19 - nor - 5 - androsten - 3β - ol - 17 - one or 5β - androstan - 3α - ol - 17 - one there can be obtained, respectively, 16 - cinnamylidene - 19 - nor - 5 - androsten - 3β-ol - 17 - one or 16 - cinnamylidene - 5β - androstan - 3α-ol-17-one.

16 - cinnamylidene - 5 - androsten - 3β - ol - 17 - one can be caused to react in pyridine solution with acetic anhydride, caproyl chloride, succinic anhydride, β - cyclohexylpropionyl chloride, benzoyl chloride, p - nitrobenzoyl chloride, phenylacetyl chloride, p - chlorophenoxyacetyl chloride, cinnamoyl chloride or nicotinoyl chloride to give, respectively, 3β-acetoxy-16-cinnamylidene-5-androsten-17-one,
3β-caproyloxy-16-cinnamylidene-5-androsten-17-one,
3β-(β-carboxypropionoxy)-16-cinnamylidene-5-androsten-17-one,
3β-(β-cyclohexylpropionoxy)-16-cinnamylidene-5-androsten-17-one,
3β-benzoyloxy-16-cinnamylidene-5-androsten-17-one,
3β-(p-nitrobenzoyloxy)-16-cinnamylidene-5-androsten-17-one,
3β-phenylacetoxy-16-cinnamylidene-5-androsten-17-one,
3β-(p-chlorophenoxyacetoxy)-16-cinnamylidene-5-androsten-17-one,
3β-cinnamoyloxy-16-cinnamylidene-5-androsten-17-one or 3β-nicotinoyloxy-16-cinnamylidene-5-androsten-17-one.

EXAMPLE 19

16 - [3 - (2 - furyl)allylidene] - 5 - androsten - 3β - ol - 17 - one [VII; R is 2 - furyl, R′ is CH₃, Z′ is CH(OH-β), Δ - 5] was prepared from 43.26 g. of 5 - androsten - 3β - ol - 17 - one and 18.32 g. of β - (2 - furyl)acrolein according to the procedure described above in Example 1. The product was recrystallized from a mixture of methylene dichloride and ethyl acetate to give 16 - [3 - (2 - furyl)allylidene] - 5 - androsten - 3β - ol - 17 - one, yellow prisms, M.P. 204.8–206.0° C. (corr.), [α]_D²⁵ = —232.5° (1% in chloroform); ultraviolet maxima at 238 and 359 mμ (ε=3,250 and 38,200).

EXAMPLE 20

16 - [3 - (2 - furyl)allylidene] - 5α - androsten - 3β-ol - 17 - one [VII; R is 2 - furyl, R′ is CH₃, Z′ is CH(OH-β)] was prepared from 116.2 g. of 5α - androstan - 3β-ol - 17 - one and 48.9 g. of 2 - furylacrolein according to the procedure described above in Example 1. The product was recrystallized from a mixture of methylene dichloride and ethyl acetate to give 16 - [3 - (2 - furyl)allylidene] - 5α - androstan - 3β - ol - 17 - one, yellow prisms, M.P. 225.0–226.8° C. (corr.), [α]_D²⁵ = —177.8° (1% in chloroform).

EXAMPLE 21

16 - cinnamylidene - 5 - androsten - 3β - ol - 17 - one oxime [VIII; R is C₆H₅, R′ is CH₃, Z′ is CH(OH-β), Δ - 5] was prepared from 36.22 g. of 16 - cinnamylidene - 5 - androsten - 3β - ol - 17 - one (Example 18) and 12.48 g. of hydroxylamine hydrochloride according to the procedure described above in Example 6. The product was recrystallized from a mixture of methylene dichloride and methanol to give 16 - cinnamylidene - 5 - androsten - 3β - ol - 17 - one oxime, colorless needles, M.P. 262.8–265.0° C., [α]_D²⁵ = —173° (1% in chloroform); ultraviolet maxima at 233 and 329 mμ (ε=8,070 and 40,800).

By replacing the 16 - cinnamylidene - 5 - androsten - 3β - ol - 17 - one in the foregoing preparation by a molar equivalent amount of 16-(2-butenylidene)-5-androsten-3β-ol-17-one,
16-[3-(3-furyl)allylidene]-5-androsten-3β-ol-17-one,
16-[3-(2-thienyl)allylidene]-5-androsten-3β-ol-17-one,
16-[3-(3-thienyl)allylidene]-5-androsten-3β-ol-17-one,
16-(4-methylcinnamylidene)-5-androsten-3β-ol-17-one,
16-(4-fluorocinnamylidene)-5-androsten-3β-ol-17-one,
16-cinnamylidene-19-nor-5-androsten-3β-ol-17-one,
16-cinnamylidene-5β-androsten-3α-ol-17-one,
3β-acetoxy-16-cinnamylidene-5-androsten-17-one,
3β-caproyloxy-16-cinnamylidene-5-androsten-17-one,
3β-(β-carboxypropionoxy)-16-cinnamylidene-5-androsten-17-one,
3β-(β-cyclohexylpropionoxy)-16-cinnamylidene-5-androsten-17-one,
3β-benzoyloxy-16-cinnamylidene-5-androsten-17-one,
3β-(p-nitrobenzoyloxy)-16-cinnamylidene-5-androsten-17-one,
3β-phenylacetoxy-16-cinnamylidene-5-androsten-17-one,
3β-(p-chlorophenoxyacetoxy)-16-cinnamylidene-5-androsten-17-one,
3β-cinnamoyloxy-16-cinnamylidene-5-androsten-17-one or 3β - nicotinoyloxy - 16 - cinnamylidene - 5 - androsten-17-one, there can be obtained, respectively, 16-(2-butenylidene)-5-androsten-3β-ol-17-one oxime,
2-[3-(3-furyl)allylidene]-5-androsten-3β-ol-17-one oxime,
2-[3-(2-thienyl)allylidene]-5-androsten-3β-ol-17-one oxime,
2-[3-(3-thienyl)allylidene]-5-androsten-3β-ol-17-one oxime,
2-(4-methylcinnamylidene)-5-androsten-3β-ol-17-one oxime,
2-(4-fluorocinnamylidene)-5-androsten-3β-ol-17-one oxime,
16-cinnamylidene-19-nor-5-androsten-3β-ol-17-one oxime,
16-cinnamylidene-5β-androsten-3α-ol-17-one oxime,
3β-acetoxy-16-cinnamylidene-5-androsten-17-one oxime,
3β-caproyloxy-16-cinnamylidene-5-androsten-17-one oxime,
3β-(β-carboxypropionoxy)-16-cinnamylidene-5-androsten-17-one oxime,
3β-(β-cyclohexylpropionoxy)-16-cinnamylidene-5-androsten-17-one oxime,
3β-benzoyloxy-16-cinnamylidene-5-androsten-17-one oxime,
3β-(p-nitrobenzoyloxy)-16-cinnamylidene-5-androsten-17-one oxime,
3β-phenylacetoxy-16-cinnamylidene-5-androsten-17-one oxime,
3β-(p-chlorophenoxyacetoxy)-16-cinnamylidene-5-androsten-17-one oxime,
3β-cinnamoyloxy-16-cinnamylidene-5-androsten-17-one oxime or 3β - nicotinoyloxy - 16 - cinnamylidene - 5-androsten-17-one oxime.

16 - cinnamylidene - 5 - androsten-3β-ol-17-one oxime (5.00 g.) was treated with 20 ml. of acetic anhydride in 40 ml. of pyridine, and the resulting product was recrystallized from a mixture of methylene dichloride and methanol to give 16 - cinnamylidene - 5 - androsten-3β-ol-17-one oxime diacetate, colorless prisms, M.P. 238.0–239.8° C. (corr.), [α]_D²⁵ = —196.2° (1% in chloroform);

ultraviolet maxima at 232 and 330 mμ (ε=9,820 and 42,300).

EXAMPLE 22

16 - [3 - (2 - furyl)allylidene] - 5 - androsten - 3β - ol-17-one oxime [VIII; R is 2-furyl, R' is CH$_3$, Z' is CH(OH-β), Δ-5] was prepared from 45.63 g. of 16-[3-(2 - furyl)allylidene]-5-androsten-3β-ol-17-one (Example 19) and 16.40 g. of hydroxylamine hydrochloride according to the procedure described above in Example 6. The product was recrystallized from a mixture of methylene dichloride, methanol and ethyl acetate to give 16-[3-(2-furyl)allylidene] - 5 - androsten - 3β - ol - 17 - one oxime, tan blades, M.P. 238.8–240.0° C. (dec.) (corr.), $[\alpha]_D^{25}$=−212.1° (1% in chloroform); ultraviolet maxima at 232, 331 and 353 mμ (ε=29,700, 44,300 and 41,100).

EXAMPLE 23

16 - [3 - (2 - furyl)allylidene] - 5α - androstan - 3β - ol-17 - one oxime [VIII; R is 2-furyl, R' is CH$_3$, Z' is CH(OH-β)] was prepared from 133.2 g. of 16-[3-(2-furyl)allylidene] - 5α - androstan-3β-ol-17-one (Example 20) and 46.9 g. of hydroxylamine hydrochloride according to the procedure described above in Example 6. The product was cyclized as described below without further purification.

A sample of 16-[3-(2-furyl)allylidene]-5α-androstan-3β-ol-17-one oxime was treated with acetic anhydride in pyridine and the resulting product recrystallized from acetone to give 16[3-(2-furyl)allylidene]-5α-androstan-3β-ol-17-one oxime diacetate, brown prisms, M.P. 232.0–233.2° C. (dec.) (corr.), $[\alpha]_D^{25}$=184.8° (1% in chloroform).

EXAMPLE 24

3β-hydroxy-5-androsteno[17,16-b]-6'-phenylpyridine
[V; R is C$_6$H$_5$, R' is CH$_3$, Z' is CH(OH-β), Δ-5]

16 - cinnamylidene - 5 - androsten - 3β - ol - 17 - one oxime (Example 21) (8.35 g.) was heated for two and one-half hours at 255–265° C. (15 mm.), and the product was chromatographed on a column of 250 g. of silica gel. The column was eluted with ether-pentane 1:1 and the product recrystallized from a mixture of methylene dichloride and methanol to give 3β-hydroxy-5-androsteno [17,16-b] - 6' - phenylpyridine, colorless needles, M.P. 238.0–243.0° C. (corr.), $[\alpha]_D^{25}$=−17.3° (1% in chloroform).

By replacing the 16-cinnamylidene-5-androsten-3β-ol-17-one oxime in the foregoing preparation by a molar equivalent amount of 16-(2-butenylidene)-5-androsten-3β-ol-17-one oxime,
16-[3-(3-furyl)allylidene]-5-androsten-3β-ol-17-one oxime,
16-[3-(2-thienyl)allylidene]-5-androsten-3β-ol-17-one oxime,
16-[3-(3-thienyl)allylidene]-5-androsten-3β-ol-17-one oxime,
16-(4-methylcinnamylidene)-5-androsten-3β-ol-17-one oxime,
16-(4-fluorocinnamylidene)-5-androsten-3β-ol-17-one oxime,
16-cinnamylidene-19-nor-5-androsten-3β-ol-17-one oxime,
16-cinnamylidene-5β-androstan-3α-ol-17-one oxime,
3β-acetoxy-16-cinnamylidene-5-androsten-17-one oxime,
3β-caproyloxy-16-cinnamylidene-5-androsten-17-one oxime,
3β-(β-carboxypropionoxy)-16-cinnamylidene-5-androsten-17-one oxime,
3β-(β-cyclohexylpropionoxy)-16-cinnamylidene-5-androsten-17-one oxime,
3β-benzoyloxy-16-cinnamylidene-5-androsten-17-one oxime,
3β-(p-nitrobenzoyloxy)-16-cinnamylidene-5-androsten-17-one oxime,
3β-phenylacetoxy-16-cinnamylidene-5-androsten-17-one oxime,
3β-(p-chlorophenoxyacetoxy)-16-cinnamylidene-5-androsten-17-one oxime,
3β-cinnamoyloxy-16-cinnamylidene-5-androsten-17-one oxime, or
3β-nicotinoyloxy-16-cinnamylidene-5-androsten-17-one oxime, there can be obtained, respectively, 3β-hydroxy-5-androsteno[17,16-b]-6'-methylpyridine,
3β-hydroxy-5-androsteno[17,16-b]-6'-(3-furyl)pyridine,
3β-hydroxy-5-androsteno[17,16-b]-6'-(2-thienyl)pyridine,
3β-hydroxy-5-androsteno[17,16-b]-6'-(3-thienyl)pyridine,
3β-hydroxy-5-androsteno[17,16-b]-6'-(p-tolyl)pyridine,
3β-hydroxy-5-androsteno[17,16-b]-6'-(p-fluorophenyl)pyridine,
3β-hydroxy-19-nor-5-androsteno[17,16-b]-6'-phenylpyridine,
3β-hydroxy-5β-androstano[17,16-b]-6'-phenylpyridine,
3β-acetoxy-5-androsteno[17,16-b]-6'-phenylpyridine,
3β-caproyloxy-5-androsteno[17,16-b]-6'-phenylpyridine,
3β-(β-carboxypropionoxy)-5-androsteno[17,16-b]-6'-phenylpyridine,
3β-(β-cyclohexylpropionoxy)-5-androsteno[17,16-b]-6'-phenylpyridine,
3β-benzoyloxy-5-androsteno[17,16-b]-6'-phenylpyridine,
3β-(p-nitrobenzoyloxy)-5-androsteno[17,16-b]-6'-phenylpyridine,
3β-phenylacetoxy-5-androsteno[17,16-b]-6'-phenylpyridine,
3β-(p-chlorophenoxyacetoxy)-5-androsteno[17,16-b]-6'-phenylpyridine,
3β-cinnamoyloxy-5-androsteno[17,16-b]-6'-phenylpyridine, or
3β-nicotinoyloxy-5-androsteno[17,16-b]-6'-phenylpyridine.

EXAMPLE 25

3β-acetoxy-5-androsteno[17,16-b] - 6' - phenylpyridine [V; R is C$_6$H$_5$, R' is CH$_3$, Z' is CH(OCOCH$_3$-β), Δ-5] was prepared by heating a mixture of 2.06 g. of 3β-hydroxy-5-androsteno[17,16-b]-6'-phenylpyridine, 10 ml. of acetic anhydride and 20 ml. of pyridine for one hour on a steam bath. The product was recrystallized from a mixture of methylene dichloride and ethyl acetate to give 3β - acetoxy-5-androsteno[17,16-b] - 6' - phenylpyridine, beige plate, M.P. 211.6–220.6° C. (corr.), $[\alpha_D^{25}]$=−7° (1% in chloroform).

EXAMPLE 26

3-oxo-4-androsteno[17,16-b]-6'-phenylpyridine
[V; R is C$_6$H$_5$, R' is CH$_3$, Z' is C=O, Δ-4]

A solution of 4.00 g. of 3β-hydroxy-5-androsteno[17,16-b]-6'-phenylpyridine (Example 24) and 40 ml. of cyclohexanone in 260 ml. of toluene was distilled, and two fractions of toluene (10 ml. and 50 ml.) were collected. Aluminum isopropoxide (4.08 g.) was dissolved in the 50 ml. portion of toluene and added during a period of seventy minutes to the refluxing solution while toluene was slowly distilled off. The reaction mixture was refluxed for forty minutes longer, cooled, and 40 ml. of saturated potassium sodium tartrate solution was added. The reaction mixture was steam distilled for one hour, 0.8 liter of distillate being collected. The resulting mixture was extracted with methylene dichloride, and the extracts were washed with water, dried over anhydrous sodium sulfate and concentrated in vacuo. The residue was recrystallized from a mixture of methylene dichloride and methanol to give 3-oxo-4-androsteno[17,16-b] - 6' - phenylpyridine, M.P. 220.2–221.6° C. (corr.), $[\alpha]_D^{25}$=+200.8° (1% in chloroform).

EXAMPLE 27

3β-hydroxy-5-androsteno[17,16-b]-6'-(2-furyl)pyridine [V; R is 2-furyl, R' is $CH_3$, Z' is $CH(OH-\beta)$, Δ-5]

16 - [3 - (2-furyl)allylidene]-5-androsten-3β-ol-17-one oxime (Example 22) was heated at 210–220° C. under nitrogen for two hours and then under water aspirator vacuum for three hours with stirring. The methylene dichloride solution portion of the product was chromatographed on a column of 900 g. of silica gel, and the column was eluted with pentane-ether 1:1 and then with ether. The product was recrystallized from a mixture of methylene dichloride, methanol and ethyl acetate to give 3β - hydroxy-5-androsteno[17,16-b]-6'-(2-furyl)pyridine, tan needles, M.P. 244.8–247.0° C. (corr.), $[\alpha]_D^{25}=9.7°$ (1% in chloroform).

EXAMPLE 28

3 - oxo-4-androsteno[17,16-b]-6'-(2-furyl)pyridine [V; R is 2-furyl, R' is $CH_3$, Z' is C=O, Δ-4] was prepared by Oppenauer oxidation of 3β-hydroxy-5-androsteno[17,16-b]-6'-(2-furyl)pyridine (Example 27) according to the procedure described above in Example 26. The product was recrystallized from a mixture of methylene dichloride and ethyl acetate to give 3-oxo-4-androsteno[17,16-b]-6'-(2-furyl)pyridine, tan rods, M.P. 222.8–225.6° C. (dec.) (corr.), $[\alpha]_D^{25}=+222.2°$ (1% in chloroform); ultraviolet maxima at 242 and 309 mμ (ε=19,500 and 18,500).

EXAMPLE 29

3β-hydroxy-5α-androstano[17,16-b]-6'-(2-furyl)pyridine [IV; R is $C_6H_5$, R' is $CH_3$( Z' is $CH(OH-\beta)$]

16 - [3- 2-furyl)allylidene]-5α-androstan-3β-ol-17-one oxime (Example 23) (41.0 g.) was heated from 190 to 230° C. over a period of one hour and then at 220–230° C. under water aspirator vacuum for four hours. The benzene soluble product was chromatographed on silica gel and eluted with ether-pentane 1:1. The product was recrystallized from acetone to give 3β-hydroxy-5α-androstano[17,16-b]-6'-(2-furyl)pyridine, biege-colored blades, M.P. 235.6–237.2° C. (corr.), $[\alpha]_D^{25}=+94.8°$ (1% in chloroform).

3β - hydroxy - 5α-androstano[17,16-b]-6'-(2-furyl)pyridine when heated with acetic anhydride in pyridine and the product recrystallized from an acetone-methanol mixture gave 3β-acetoxy-5α-androstano[17,16-b]-6'-(2-furyl)pyridine, M.P. 181–183° C. (uncorr.).

EXAMPLE 30

3 - oxo - 5α-androstano[17,16-b]-6'-(2-furyl)pyridine [V; R is 2-furyl, R' is $CH_3$, Z' is C=O] was prepared by the Oppenauer oxidation of 3β-hydroxy-5α-androstano-[17,16-b]-6'-(2-furyl)pyridine (Example 29) by the procedure described above in Example 26. The product was recrystallized from a mixture of methylene dichloride and acetone to give 3 - oxo - 5α - androstano[17,16-b]-6'-(2-furyl)pyridine, M.P. 216–228° C. (uncorr.).

EXAMPLE 31

3-oxo-4-androsteno[17,16-b]pyridine [V; R is H, R' is $CH_3$, Z' is C=O, Δ-4]

3 - oxo - 4 - androsteno[17,16-b]-6'-(2-furyl)pyridine was subjected to ozonolysis by the procedure described above in Example 16, and the resulting 3-oxo-4-androsteno[17,16-b]-6'-carboxypyridine was decarboxylated by heating it at 220–230° C. for three hours. The product was dissolved in methylene dichloride and chromatographed on a column of 200 g. of silica gel. The column was eluted with pentane-ether and then with ether. The latter brought out the desired product which was recrystallized with a mixture of methylene dichloride and ethyl acetate to give 3-oxo-4-androseno[17,16-b]pyridine, M.P. 199–201° C. (uncorr.); ultraviolet maxima at 242, 268 and 276 mμ (ε=17,900, 8,050 and 5,200); infrared absorption at 3.35, 3.44, 6.04, 6.23, 6.29, 6.36, 6.83 and 6.95μ.

EXAMPLE 32

3β - hydroxy - 5α-androstano[17,16-b]-6'-carboxypyridine [V; R is COOH, R' is $CH_3$, Z is $CH(OH-\beta)$] was prepared by ozonolysis of 7.83 g. of 3β-hydroxy-5α-androstano[17,16 - b] - 6'-(2-furyl)pyridine (Example 29) according to the procedure described above in Example 16. The product was recrystallized from a mixture of methylene dichloride and methanol to give 3β-hydroxy-5α-androstano[17-16-b]-6'-carboxypyridine containing ½ mole of methanol of crystallization, colorless prisms, M.P. 220.0–222.8° C., $[\alpha]_D^{25}=+83.8°$ (1% in chloroform); ultraviolet maxima at 233 and 277 mμ (ε=7,000 and 8,100).

EXAMPLE 33

3β-hydroxy-5α-androstano[17,16-b]pyridine [V; R is H, R' is $CH_3$, Z' is $CH(OH-\beta)$]

3β - hydroxy - 5α-androstano[17,16-b]-6'-carboxypyridine (Example 32) (3.54 g.) was heated from 190 to 220° C. during one hour and then heated at 222° C. for one hour under nitrogen. The resulting product was dissolved in methylene dichloride and chromatographed on a column of 100 g. of aluminum oxide. The column was eluted with pentane-ether and then with ether. The latter brought out the desired product which was recrystallized from a mixture of methylene dichloride and acetone to give 3β-hydroxy-5α-androstano[17,16-b]pyridine, colorless plates, M.P. 195.0–195.8° C. (corr.), $[\alpha]_D^{25}=+41.5°$ (1% in chloroform).

EXAMPLE 34

3-oxo-5α-androstano[17,16-b]pyridine [V; R is H, R' is $CH_3$, Z' is C=O] was prepared by ozonolysis and decarboxylation of 3-oxo-5α-androstano[17,16-b]-6' (2-furyl) pyridine (Example 30) according to the procedure described above in Example 16. The product was dissolved in methylene dichloride, chromatographed on aluminum oxide and eluted with pentane-ether 1:1. The product was recrystallized from a mixture of acetone and hexane and then from acetone to give 3-oxo-5α-androstano[17,16-b]pyridine, M.P. 174.2–175.2° C. (corr.), $[\alpha]_D^{25}=+69.2°$ (1% in chloroform).

EXAMPLE 35

(a) A solution of 3.18 g. of 17β-hydroxy-2-hydroxymethylene-5α-androstan-3-one, 1.01 g. of triethylamine, 0.158 g. of paraformaldehyde and 0.38 g. of p-toluenesulfonic acid monohydrate in 20 ml. of absolute ethanol was refluxed for sixteen hours. The mixture was cooled and seeded with a trace of the desired product to cause separation of 2α,2'α-methylenebis(17β-hydroxy-5α-androstan-3-one), colorless needles, M.P. 313–315° C. (uncorr.) when recrystallized from methanol; $[\alpha]_D^{25}=-0.4$ (1% in chloroform); ultraviolet maximum at 284 mμ (ε=64.2); diacetate, M.P. 303–305° C. (uncorr.) (from methanol).

(b) Bis(17β-acetoxyandrostano[3,2 - b:2',3' - e])pyridine [IX; R'' is H, Y is $COCH_3$].—A solution of 1.31 g. of 2α,2'α-methylenebis(17β-hydroxy-5α-androstan-3-one), 0.61 g. of hydroxylamine hydrochloride, 20 ml. of pyridine and 20 ml. of absolute ethanol was heated at reflux for four hours and then quenched in 300 ml. of water. The resulting amorphous solid comprising bis(17β-hydroxyandrostano[3,2-b:2',3'-e])pyridine was warmed on a steam bath for two hours with 8 ml. of acetic anhydride in 16 ml. of pyridine, then added to 200 ml. of water. The product was separated and recrystallized twice from a methylene dichloride-methanol mixture to give bis(17β-acetoxyandrostano[3,2 - b:2′,3′ - e])pyridine, colorless plates, M.P. above 330° C., [α]$_D^{25}$=+53.9° (1% in chloroform); ultraviolet maximum at 281 mμ (ε=9,700).

By replacing the 2-hydroxymethylene-5α-androstan-3-one in part (a) by a molar equivalent amount of 2-hydroxymethylene-17α-methyl-5α-androstan-17β-ol - 3 - one, there can be obtained bis(17β-acetoxy-17α-methyl-androstano[3,2-b:2′,3′-e])pyridine [IX; R″ is CH$_3$, Y is COCH$_3$].

I claim:

1. A compound selected from the group consisting of (A) compounds of the formula

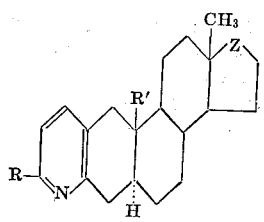

where R is a member of the group consisting of hydrogen, carboxy, lower-alkyl, phenyl, furyl and thienyl; R′ is a member of the group consisting of hydrogen and methyl; Z is a member of the group consisting of C=O, CH(OH-β), C(lower-alkyl)(OH-β), CH(OAcyl-β), and C(lower-alkyl)(OAcyl-β), Acyl being carboxylic acyl having from 1 to 10 carbon atoms; (B) compounds of the above formula having a double bond in the 4,5-position; and (C) compounds of the above formula having double bonds in the 4,5- and the 6,7-positions.

2. 17β-acetoxy-5α-androstano[3,2-b]pyridine.

3. 17β-hydroxy-17α-methyl-5α-androstano[3,2 - b]pyridine.

4. The process for preparing a compound selected from the group consisting of (A) compounds of the formula

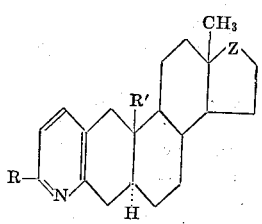

wherein R is a member of the group consisting of lower-alkyl, phenyl, furyl and thienyl; R′ is a member of the group consisting of hydrogen and methyl; Z is a member of the group consisting of CH(OH-β), C(lower-alkyl)(OH-β), CH(OAcyl-β), and C(lower-alkyl)(OAcyl-β), Acyl being carboxylic acyl having from 1 to 10 carbon atoms; (B) compounds of the above formula having a double bond in the 4,5-position; and (C) compounds of the above formula having double bonds in the 4,5- and the 6,7-positions, which comprises heating a compound selected from the group consisting of (A) compounds of the formula

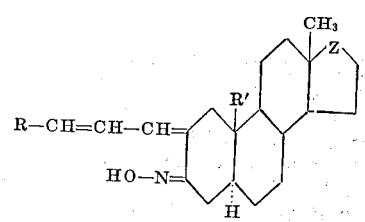

wherein R, R′ and Z have the meanings given above; (B) compounds of the latter formula having a double bond in the 4,5-position; and (C) compounds of the latter formula having double bonds in the 4,5- and the 6,7-positions.

5. The process for preparing a compound selected from the group consisting of (A) compounds of the formula

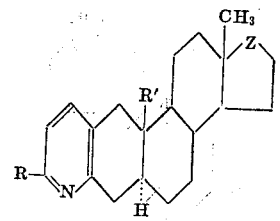

wherein R is hydrogen; R′ is a member of the group consisting of hydrogen and methyl; Z is a member of the group consisting of C=O, CH(OH-β), C(lower-alkyl)(OH-β), CH(OAcyl-β), and C(lower-alkyl)(OAcyl-β), Acyl being carboxylic acyl having from 1 to 10 carbon atoms; (B) compounds of the above formula having a double bond in the 4,5-position; and (C) compounds of the above formula having double bonds in the 4,5- and the 6,7-positions, which comprises ozonizing a compound of the above formula wherein R is 2-furyl and decarboxylating by heating the resulting compound of the above formula wherein R is carboxy.

6. A compound selected from the group consisting of (A) compounds of the formula

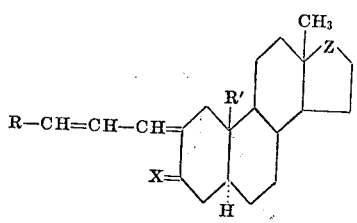

wherein R is a member of the group consisting of lower-alkyl, phenyl, furyl and thienyl; R′ is a member of the group consisting of hydrogen and methyl; X is a member of the group consisting of O, HO—N and Acyl—O—N; Z is a member of the group consisting of CH(OH-β), C(lower-alkyl)(OH-β), CH(OAcyl-β), and C(lower-alkyl)(OAcyl-β), Acyl being carboxylic acyl having from 1 to 10 carbon atoms; (B) compounds of the above formula having a double bond in the 4,5-position; and (C) compounds of the above formula having double bonds in the 4,5- and the 6,7-positions.

7. 2-cinnamylidene-5α-androstan-17β-ol-3-one.

8. 17α-methyl-2-[3-(2-furyl)allylidene] - 5α-androstan-17β-ol-3-one.

9. The process for preparing a compound selected from the group consisting of (A) compounds of the formula

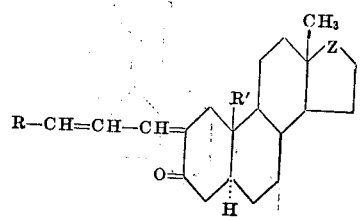

wherein R is a member of the group consisting of lower-alkyl, phenyl, furyl and thienyl; R′ is a member of the group consisting of hydrogen and methyl; Z is a member of the group consisting of CH(OH-β), C(lower-alkyl)(OH-β), CH(OAcyl-β) and C(lower-alkyl)(OAcyl-β), Acyl being carboxylic acyl having from 1 to 10 carbon atoms; (B) compounds of the above formula having a double bond in the 4,5-position; and (C) compounds of the above formula having double bonds in the 4,5- and the 6,7-positions, which comprises reacting in the presence of a strong base a compound selected from the group consisting of (A) compounds of the formula

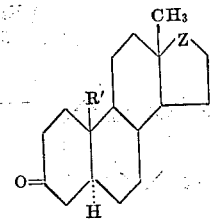

(B) compounds of the latter formula having a double bond in the 4,5-position; and (C) compounds of the latter formula having double bonds in the 4,5- and the 6,7-positions, with a compound of the formula

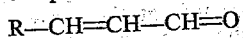

R—CH=CH—CH=O wherein R is a member of the group consisting of lower-alkyl, phenyl, furyl and thienyl.

10. A compound selected from the group consisting of (A) compounds of the formula

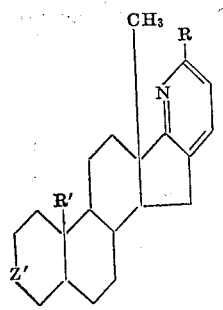

wherein R is a member of the group consisting of hydrogen, carboxy, lower-alkyl, phenyl, furyl and thienyl; R' is a member of the group consisting of hydrogen and methyl; Z' is a member of the group consisting of C=O, CH(OH) and CH(OAcyl), Acyl being carboxylic acyl having from 1 to 10 carbon atoms; (B) compounds of the above formula where Z' is C=O and having a double bond in the 4,5-position; and (C) compounds of the above formula where Z' is CH(OH) or CH(OAcyl) and having a double bond in the 5,6-position.

11. 3β-hydroxyandrostano[17,16-b]pyridine.
12. 3-oxoandrostano[17,16-b]pyridine.
13. The process for preparing a compound selected from the group consisting of (A) compounds of the formula

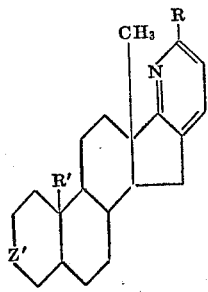

wherein R is a member of the group consisting of lower-alkyl, phenyl, furyl and thienyl; R' is a member of the group consisting of hydrogen and methyl; Z' is a member of the group consisting of CH(OH) and CH(OAcyl), Acyl being carboxylic acyl having from 1 to 10 carbon atoms; and (B) compounds of the above formula having a double bond in the 5,6-position, which comprises heating a compound selected from the group consisting of (A) compounds of the formula

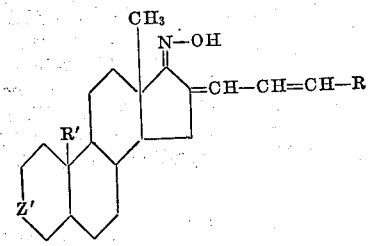

wherein R, R' and Z' have the meanings given above; and (B) compounds of the latter formula having a double bond in the 5,6-position.

14. The process for preparing a compound selected from the group consisting of (A) compounds of the formula

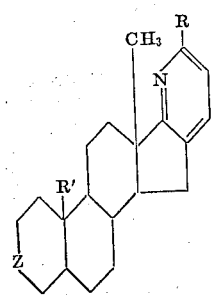

wherein R is hydrogen; R' is a member of the group consisting of hydrogen and methyl; Z is a member of the group consisting of C=O, CH(OH) and CH(OAcyl), Acyl being carboxylic acyl having from 1 to 10 carbon atoms; (B) compounds of the above formula where Z is C=O and having a double bond in the 4,5-position; and (C) compounds of the above formula where Z is CH(OH) or CH(OAcyl) and having a double bond in the 5,6-position, which comprises ozonizing a compound of the above formula where R is 2-furyl and decarboxylating by heating the resulting compound of the above formula wherein R is carboxy.

15. A compound selected from the group consisting of (A) compounds of the formula

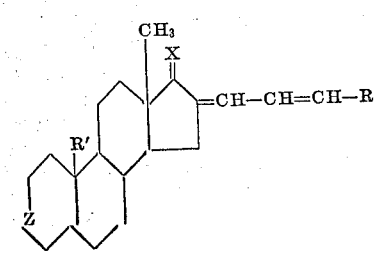

wherein R is a member of the group consisting of lower-alkyl, phenyl, furyl and thienyl; R' is a member of the group consisting of hydrogen and methyl; X is a member of the group consisting of HO—N and Acyl—O—N; Z is a member of the group consisting of CH(OH) and CH(OAcyl), Acyl being carboxylic acyl having from 1 to 10 carbon atoms; and (B) compounds of the above formula having a double bond in the 5,6-position.

16. 16-cinnamylidene-5-androsten-3β-ol-17-one oxime.
17. 16-[3-(2-furyl)allylidene]-5α-androstan-3β - ol-17 one.

18. A process for preparing a compound selected from the group consisting of (A) compounds of the formula

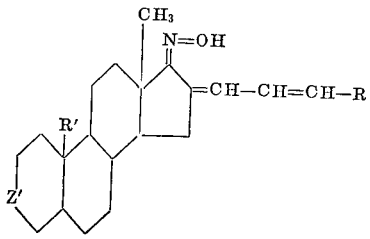

wherein R is a member of the group consisting of lower-alkyl, phenyl, furyl and thienyl; R' is a member of the group consisting of hydrogen and methyl; Z' is a member of the group consisting of CH(OH) and CH(OAcyl), Acyl being carboxylic acyl having from 1 to 10 carbon atoms; and (B) compounds of the above formula having a double bond in the 5,6-position, which comprises reacting in the presence of a base a compound selected from the group consisting of (A) compounds of the formula

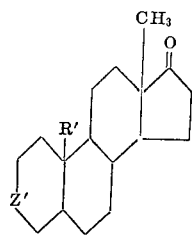

and (B) compounds of the latter formula having a double bond in the 4,5-position, wherein R' is a member of the group consisting of hydrogen and methyl; and Z' is a member of the group consisting of CH(OH) and CH(OAcyl), with a compound of the formula R—CH=CH—CH=O, wherein R is a member of the group consisting of lower-alkyl, phenyl, furyl and thienyl, and reacting the resulting compound with hydroxylamine.

19. A compound of the formula

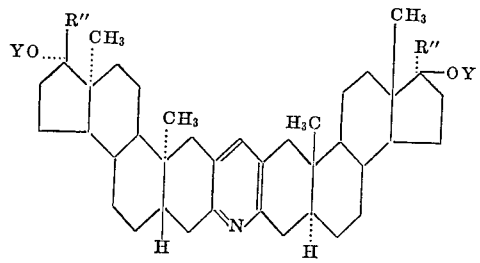

wherein R'' is a member of the group consisting of hydrogen and lower-alkyl, and Y is a member of the group consisting of hydrogen and carboxylic acyl having from 1 to 10 carbon atoms.

20. A process for preparing a compound of the formula

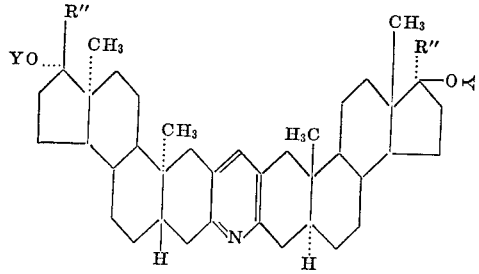

which comprises reacting with hydroxylamine a compound of the formula

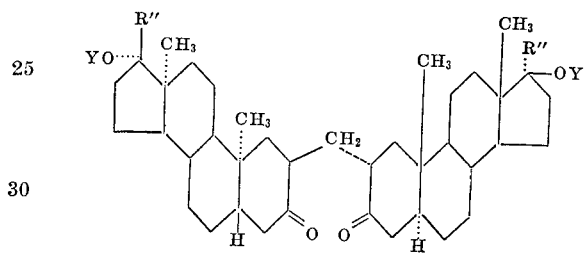

wherein R'' is a member of the group consisting of hydrogen and lower-alkyl, and Y is a member of the group consisting of hydrogen and carboxylic acyl having from 1 to 10 carbon atoms.

21. A compound according to claim 1 wherein R is hydrogen, phenyl or 2-furyl, and R' is methyl.

22. A compound according to claim 6 wherein R is phenyl or 2-furyl, and R' is methyl.

23. A compound according to claim 10 wherein R is hydrogen, carboxy, phenyl or 2-furyl, and R' is methyl.

24. A compound according to claim 15 wherein R is phenyl or 2-furyl, and R' is methyl.

References Cited

UNITED STATES PATENTS 3,178,409  4/1965  Pike.

HENRY A. FRENCH, *Primary Examiner.*

PO-1050
(5/69)

UNITED STATES PATENT OFFICE
CERTIFICATE OF CORRECTION

Patent No. 3,409,609      Dated November 5, 1968

Inventor(s) Theodore C. Miller

It is certified that error appears in the above-identified patent and that said Letters Patent are hereby corrected as shown below:

Column 1, line 2, in title, "ADROSTANO-" should read --ANDROSTANO- --. Column 2, line 54, after "of" insert --the oxime,--. Column 4, lines 70-75, left-hand portion of formula,

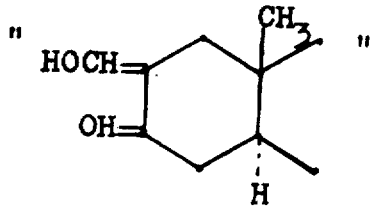 should read 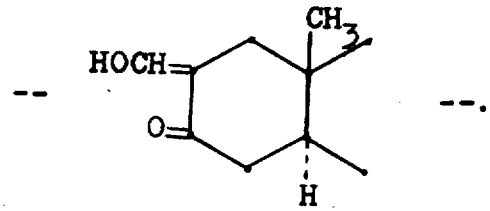

Column 7, line 21, "4-androstan-" should read --4-androsten- --; line 37, "4-androstan-" should read --4-androsten- --; line 50, "infared" should read --infrared--. Column 8, line 23, "20-245°C." should read -- 220-245°C.--; line 57, "17α-hydroxy-" should read --17β-hydroxy- --. Column 9, line 65, "pyrdine." should read --pyridine.--. Column 10, line 27, "15,000" should read --15,100--. Column 11, line 62, "5α-androsten-" should read --5α-androstan- --. Column 12, line 20, "5β-androsten-" should read --5β-androstan- --; line 49, "5β-androsten-" should read --5β-androstan- --. Column 13, line 32, "184.8°" should read -- -184.8°--. Column 14, line 49, "plate," should read --plates,--; and "[α]$_D^{25}$" should read --[α]$_D^{25}$--. Column 15, line 35, "IV;" should read --V;--; and "CH$_3$(" should read --CH$_3$,-- line 42, "5-andro-" should read --5α-andro- --. Column 16, line 2, "4-androseno" should read --4-androsteno--.

SIGNED AND
SEALED

AUG 18 1970

(SEAL)
Attest:

Edward M. Fletcher, Jr.
Attesting Officer

WILLIAM E. SCHUYLER, JR.
Commissioner of Patents